Jan. 19, 1937.  W. L. MORRISON  2,067,939

AUTOMOBILE VENTILATING DEVICE

Filed June 24, 1935  3 Sheets-Sheet 1

Inventor:
Willard L. Morrison
By Parker & Carter Attys.

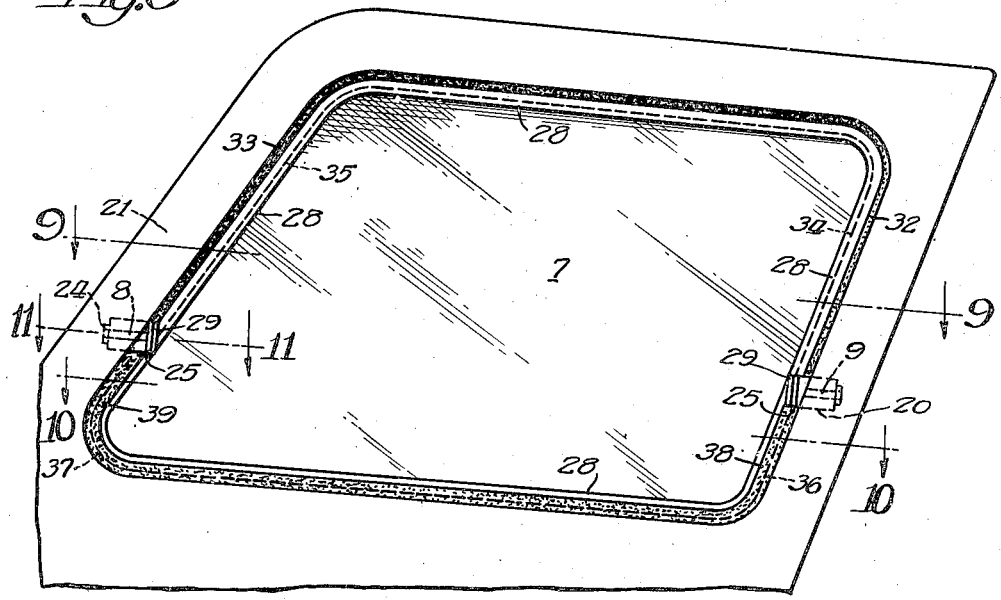
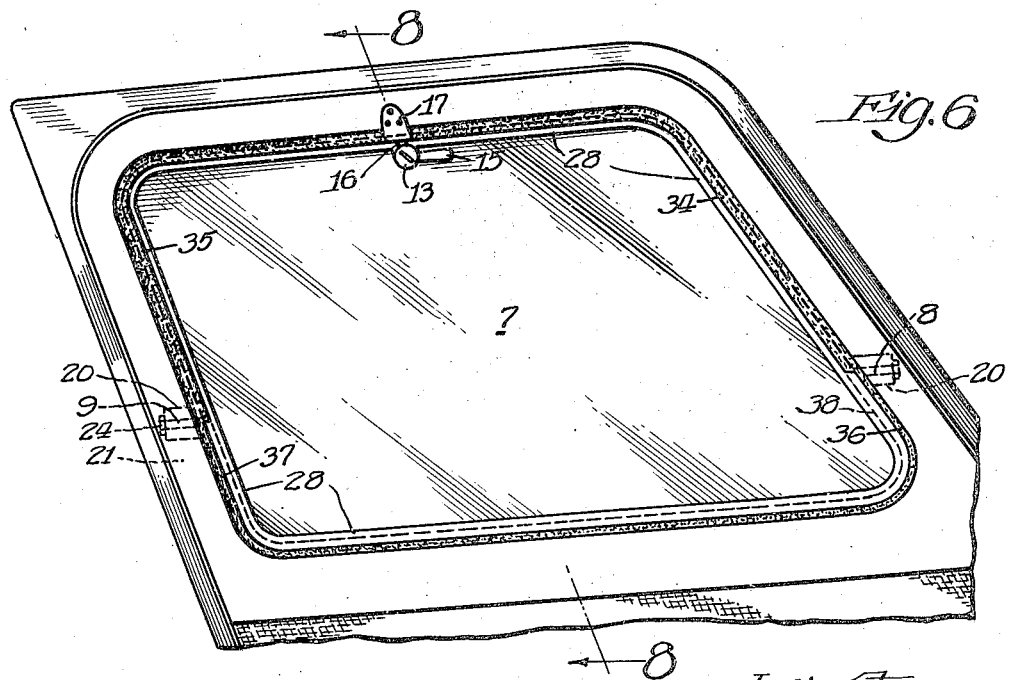

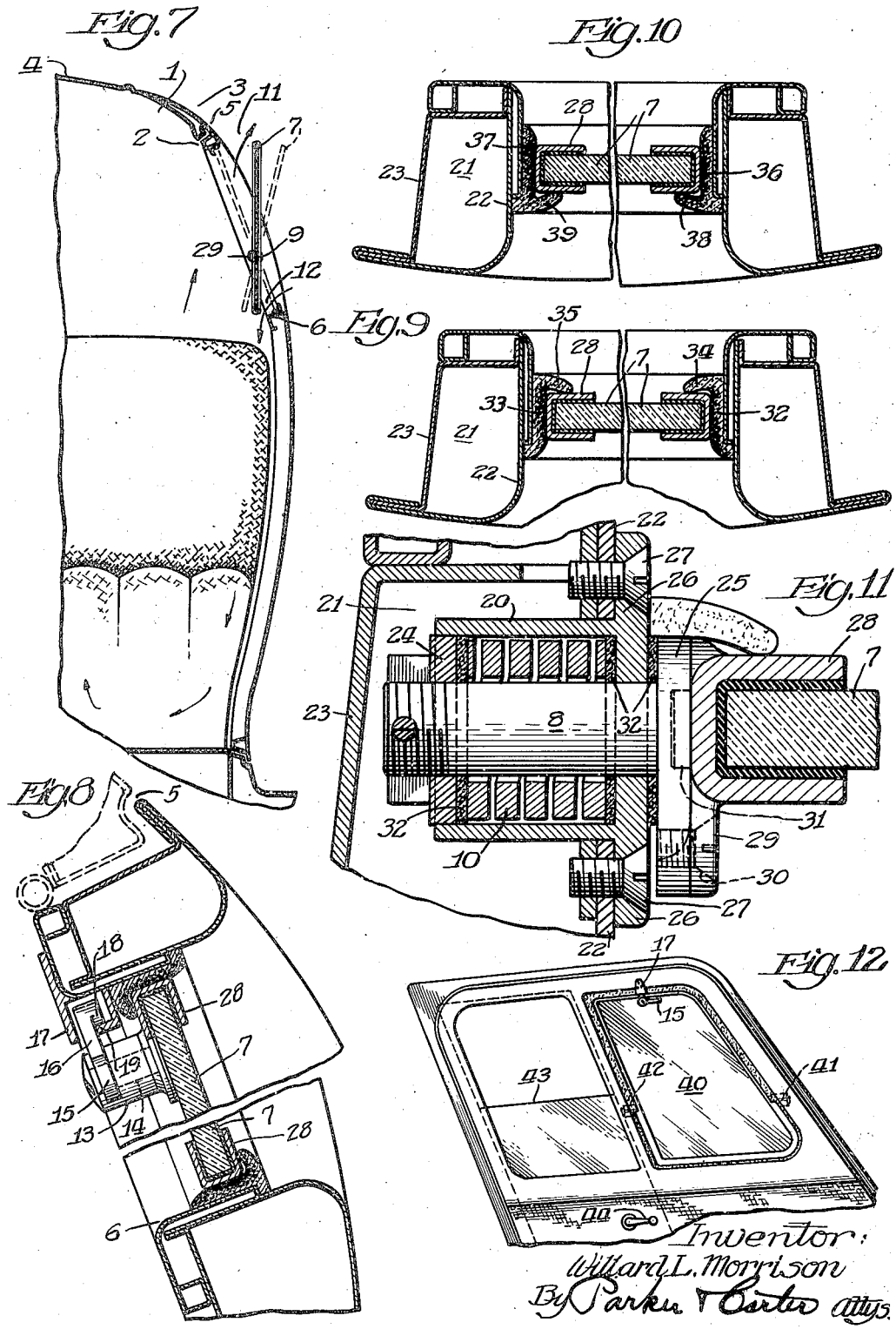

Patented Jan. 19, 1937

2,067,939

UNITED STATES PATENT OFFICE 2,067,939

AUTOMOBILE VENTILATING DEVICE

Willard L. Morrison, Lake Forest, Ill.

Application June 24, 1935, Serial No. 28,045

10 Claims. (Cl. 296—44)

This invention relates to automobile ventilating devices and has for an object to provide a new and improved device of this description.

The invention has as a further object to provide an automobile ventilating device by means of which air is withdrawn from the upper portion of the automobile body and simultaneously directed downwardly toward the lower part of the automobile body.

In the use of automobiles in warm weather the portion of the body of the rider which suffers most from the heat is the lower portion, and particularly the portion engaging the seat of the automobile. This invention has as a further object to provide a ventilating device which directs outside air down toward the lower part of the body of the rider.

The invention has as a further object to provide a ventilating device for automobiles which, when in operation, offers substantially no wind resistance to the forward movement of the automobile.

The invention has other objects which are more particularly pointed out in the accompanying description.

Referring now to the drawings, Fig. 1 is a side view showing an automobile embodying one form of the ventilating device;

Fig. 5 is an enlarged outside view of the upper end of the front door;

Fig. 6 is an inside view of the part shown in Fig. 5;

Fig. 7 is an enlarged view, with parts broken away, showing the window in its ventilating position.

Fig. 8 is a sectional view taken on line 8—8 of Fig. 5, with parts broken away;

Fig. 9 is an enlarged sectional view taken on line 9—9 of Fig. 5, with parts broken away;

Fig. 10 is a sectional view taken on line 10—10 of Fig. 5, with parts broken away;

Fig. 11 is an enlarged sectional view taken on line 11—11 of Fig. 5, with parts broken away; and Fig. 12 is a view showing a modified construction.

Like numerals refer to like parts throughout the several figures.

Figure 1:
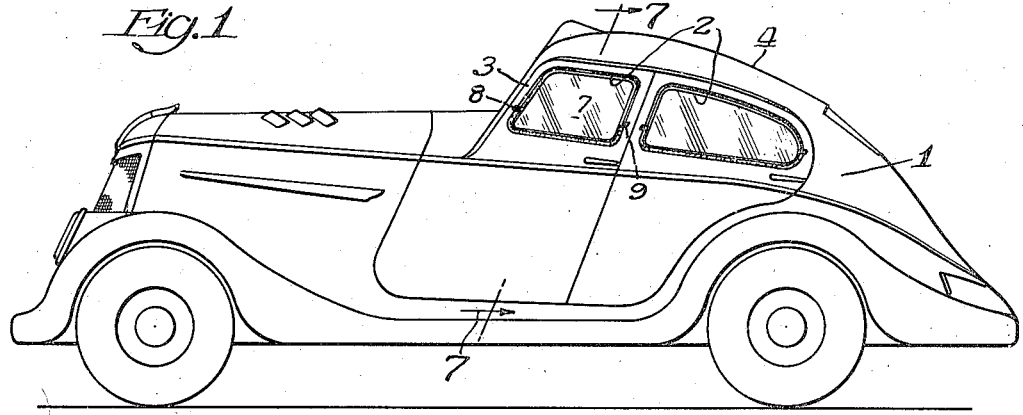
Figure 2:
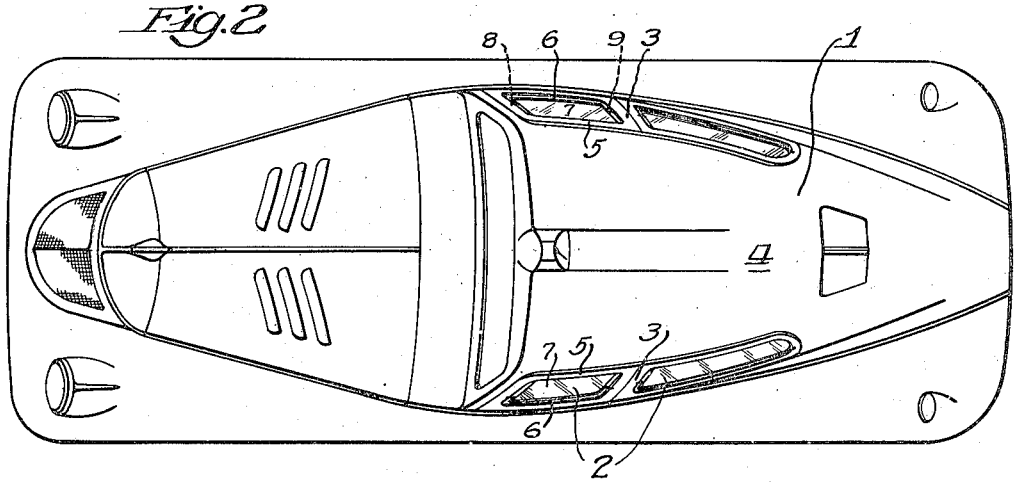
Fig. 2 is a plan view of the device shown in Fig. 1.
Figure 3:
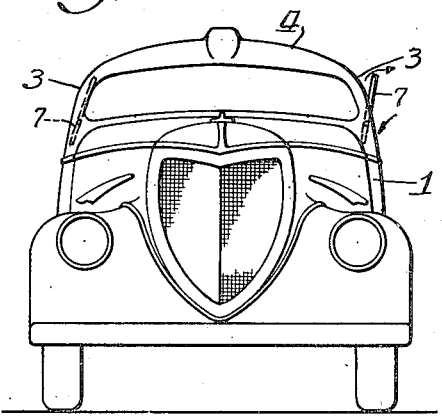
Fig. 3 is a front view of the device shown in Fig. 1.
Figure 4:
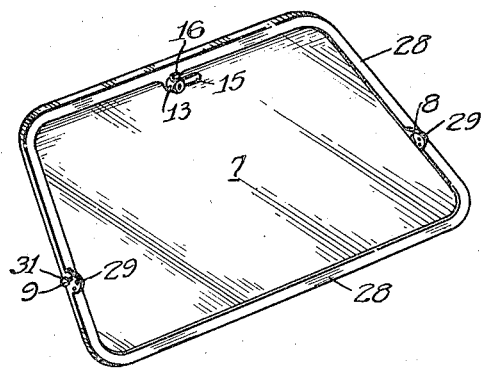
Fig. 4 is a perspective view of one of the windows removed from the automobile.

Referring now to the drawings, I have illustrated an automobile body 1, having a window opening 2. In the construction shown the portion 3 of the body, in which the window opening or openings are provided, is inclined inwardly toward the top 4, as shown in Figs. 2 and 3 and this portion of the body is preferably inclined inwardly at a considerable angle, so that a vertical line through the upper edge 5 of the window opening will fall a considerable distance within the lower edge 6 of the window opening. The ventilating arrangement may be used in connection with the window in the door or doors, or the rear window, or any or all of the windows.

Pivotally mounted in the window opening is the window 7. This window is pivotally mounted upon a substantially horizontal axis. There is preferably provided at the front and rear edges of the window pivots 8 and 9. Both pivots, or at least one pivot, are provided with means for resisting the pivotal movement of the window so as to hold the window in any of its various positions. These pivots are preferably located nearer the bottom of the window than the top thereof. Any form of pivot may be used, and I have herein shown the friction pivot with the compressed spring 10, arranged to resist the movement of the window about its pivotal axis. It will be noted that when the window is moved about its pivotal axis there is provided between its upper edge and the upper edge 5 of the window opening a space 11, and there is provided between its lower edge and the lower edge 6 of the window opening a space 12. When the car is moved forward the relative movement of the car in the air produces a suction that causes the air in the upper part of the body to be drawn up through the space 11, and causes air to pass down through the opening 12, the outer face of the window guiding this air and directing it down to the lower part of the body of the automobile and down to the lower part of the body of the rider. It will be seen that the window under ordinary conditions does not act as a deflector, due to the movement of the air, to direct the outside air into the body or inside air out of the body, but simply acts to form an upper and lower opening, and the movement of the air is caused by the suction produced by the movement of the automobile body through the air, the suction causing the air to go out at the top and to go in at the bottom. It will further be seen that the window 7 may be adjusted to any desired position to properly regulate the amount of air going out of the automobile or into the automobile. There is a locking device which may be placed at any desired position and is illustrated as being placed at the top of the window. This locking device when in locking position locks the window in closed position. As illustrated, this locking device consists of a part 13 rotatably mounted upon a projection 14 attached to the window. This part 13 is rotated by means of the handle 15. Connected with the part 13 is an engaging member 16 which engages a holding member 17, attached to the window frame. The engaging member 16 has projection 18 which overlaps a part 19 on the holding device 17. This locking device locks the window against opening.

In Fig. 11 there is shown in detail a particular construction of the window pivot, the pivot being mounted in a casing 20 which projects into the space 21 between the members 22 and 23 of the door and is completely concealed. The pivot 8 passes through this casing and is surrounded by the spring 10 and there is a nut 24 threaded to the pivot which, when tightened up, compresses the spring 10. The pivot is provided with an enlarged end 25. The casing 20 is also provided with an enlarged end 26 and it is fastened to the wall 22 by the fastening device 27. The window frame 28 is provided with a projection 29 which is fastened by a fastening device 30 to the part 25. The enlarged end 25 of the pivot is provided with a recess and the window frame 28 is provided with a projection 31. It will be seen that the pivot is entirely separate from the window and is attached to the body of the car and that the window is then placed in position and is held to the pivot by the fastening device 30 and the projection 31. There are friction washers 32 at the ends of the springs preferably. The projection 29 and the fastening device 30 are within the automobile so that they cannot be removed from the outside.

There is provided some sealing device for the window. Since the window moves about the pivot and the lower part moves in and the upper part out, the sealing device must be arranged accordingly. Referring now to Fig. 9, which is a section through the window above the pivot, they are sealing members 32 and 33 which are interposed between the window and the window frame or reveals and connected with these sealing members and located on the outside of the window are the window engaging sealing parts 34 and 35, so that when the window is closed it is sealed on its outer face and on its edges. Fig. 10 shows the sealing device below the pivot and in this construction there are sealing elements 36 and 37 for engaging the edges of the window and the sealing elements 38 and 39 for engaging the inner face of the window.

In Fig. 12 I have shown a modified construction where the window is made up of two sections, the pivoted section 40 which is mounted on the pivots 41 and 42, and swings on a horizontal axis, and the sliding section 43 at the rear thereof, which slides up and down by operating the handle 44 in the usual way. The horizontal pivoted section may be also arranged in any of these devices to be moved up and down like the section 43, if desired.

I have demonstrated that the suction through the opening 11, produced by the rapid movement of the automobile through the air, is very great so that only a small opening is required to secure the desired amount of ventilation. Therefore it is not necessary to have any window part projecting out into the air stream so as to afford resistance to the forward movement of the air and interfere with the streamlining of the automobile.

With this construction there may be a single window which fills the ventilating opening and this window may be pivotally mounted on a horizontal axis so that it remains in the window opening except for its pivotal movement, or it may be arranged so that it can be slid down to provide a fully open window opening, or the window may be divided and either the front or rear portion pivoted on the horizontal axis, and the other portion arranged to slide up and down, as shown in Fig. 12.

It will be seen that this device adapts itself to various arrangements and all these various arrangements secure an efficient ventilation of the automobile and directing of the air down to the lower part of the automobile where it is most needed to cool the rider.

It will be seen that by means of this construction I have provided a top and bottom ventilation. It will further be seen that since the window does not project in an inclined position out into the air stream, there is substantially no pressure upon it tending to move it from its ventilating position when the automobile is moved either at a low speed or at a high speed.

It will further be seen that by means of this construction a very small opening of the window will cause a proper ventilation of the automobile without an appreciable draft. It will further be noted that the air which is delivered down through the opening 12 stirs up the air in the lower part of the automobile and displaces the air in the lower part of the automobile, so as to insure complete withdrawal of the air from all parts of the automobile, thus insuring the proper cooling effect on the rider and the proper ventilation throughout the entire body of the automobile.

I claim:

1. An automobile ventilating device comprising a body having a windshield, a window opening back of said windshield, the portion of the body having the window opening extending longitudinally of the body of the automobile being inclined from the bottom toward the top, a window in said window opening, inclined from the bottom toward the top, said window pivoted so as to move about a horizontal axis extending longitudinally of the body of the automobile so as to provide, when moved about its pivot, a suction opening at the top and an air admission opening at the bottom, whereby the suction produced by the movement of the automobile draws air out of the top portion of the window opening and directs air into the bottom portion of the window opening.

2. An automobile ventilating device comprising a body having a window opening, the portion of the body having the window opening being inclined from the bottom toward the top, a window in said window opening extending longitudinally of the body of the automobile and, inclined from the bottom toward the top, said window pivoted so as to move about a horizontal axis extending longitudinally of the body of the automobile so as to provide, when moved about its pivot, a longitudinally extending suction opening at the top and an air admission opening at the bottom, whereby the suction produced by the movement of the automobile draws air out of the top portion of the window opening and directs air into the bottom portion of the window opening, the window directing the latter air downwardly into the lower part of the automobile.

3. An automobile ventilating device comprising a body having a windshield, a window opening back of said windshield, the portion of the body having the window opening extending longitudinally of the body of the automobile being inclined from the bottom toward the top, a window in said window opening, inclined from the bottom toward the top, said window pivoted so as to move about a horizontal axis extending longitudinally of the body of the automobile so as to provide, when moved about its pivot, a suction opening at the top and an air admission opening at the bottom, whereby the suction produced by the movement of the automobile draws air out of the top portion of the window opening and directs air into the bottom portion of the window opening, the horizontal pivotal axis being nearer to the bottom part thereof than to the top, the window directing the latter air downwardly into the lower part of the automobile.

4. An automobile ventilating device comprising an automobile body having a window opening therein, a window extending lengthwise of the automobile and pivoted so as to move about a substantially horizontal axis extending longitudinally of the automobile, so that the upper part of the window moves outwardly and the lower part of the window moves inwardly, so that the movement of the automobile produces a suction which draws air out of the upper part of the window opening and air down through the lower part of the window opening, the window directing the latter air downwardly into the lower part of the automobile body.

5. An automobile ventilating device comprising an automobile body having a window opening in the side thereof, a window extending lengthwise of the automobile substantially in the direction of travel of the automobile and pivoted so as to move about a substantially horizontal axis, so that the upper part of the window moves outwardly and the lower part of the window moves inwardly, so that the movement of the automobile produces a suction which draws air out of the upper part of the window opening and air down through the lower part of the window opening, the window directing the latter air downwardly into the lower part of the automobile body, the pivotal horizontal axis being in the plane of the window nearer to the bottom of the window than to the top thereof.

6. An automobile ventilating device comprising an automobile body having a window opening therein, a window mounted in said window opening and extending longitudinally of the automobile and having front and rear ends, substantially horizontal pivots at the front and rear ends of said window which pivotally mount the window upon a substantially horizontal axis so that the upper part of the window moves outwardly and the lower part of the window moves inwardly, so that the movement of the automobile produces a suction which draws air out of the upper part of the window opening and air down through the lower part of the window opening, the window directing the latter air downwardly into the lower part of the automobile body.

7. An automobile ventilating device comprising an automobile body having a window opening therein, a window in said window opening, pivots for the window, one of said pivots being separated from the window and being provided with a casing attached to the window frame and projecting through it and located outside the boundary of the window and projecting into a recess in the window frame, and provided with a friction device, and fastening means for fastening the window to the pivot after the pivot is in position.

8. An automobile ventilating device comprising an automobile body having a window opening in the side thereof, a window pivotally mounted in said window opening to move about a substantially horizontal axis extending lengthwise of the automobile, the window being in a substantially vertical position when in its ventilating position, so as to provide an opening extending longitudinally of the automobile and of substantially equal width from one end to the other.

9. An automobile ventilating device comprising an automobile body having a window opening in the side thereof, a window extending lengthwise of the automobile substantially in the direction of travel of the automobile and pivoted so as to move about a substantially horizontal axis, so that the upper part of the window moves outwardly and the lower part of the window moves inwardly, so that the movement of the automobile produces a suction which draws air out of the upper part of the window opening and air down through the lower part of the window opening, the window directing the latter air downwardly into the lower part of the automobile body, and sealing devices for said window.

10. An automobile ventilating device comprising an automobile body having a window opening in the side thereof, a window extending lengthwise of the automobile substantially in the direction of travel of the automobile and pivoted so as to move about a substantially horizontal axis, so that the upper part of the window moves outwardly and the lower part of the window moves inwardly, so that the movement of the automobile produces a suction which draws air out of the upper part of the window opening and air down through the lower part of the window opening, the window directing the latter air downwardly into the lower part of the automobile body, and sealing devices for said window, the sealing devices above the pivots having parts which engage the inner face of the window, the sealing devices below the pivots having parts which engage the outer face of the window.

WILLARD L. MORRISON.